United States Patent
Gaspar et al.

(10) Patent No.: US 6,785,849 B1
(45) Date of Patent: Aug. 31, 2004

(54) ARRANGEMENT FOR REDUCING A MEDIA INDEPENDENT INTERFACE SPEED IN A NETWORK SWITCH EMULATION SYSTEM

(75) Inventors: Harand Gaspar, Cupertino, CA (US); Shashank Merchant, Santa Clara, CA (US); Jiu An, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 594 days.

(21) Appl. No.: 09/779,483

(22) Filed: Feb. 9, 2001

(51) Int. Cl.[7] .............................................. G06F 11/00
(52) U.S. Cl. ............................................ 714/43; 714/4
(58) Field of Search ........................... 714/4, 25, 43, 714/28

(56) References Cited

U.S. PATENT DOCUMENTS

| | | | |
|---|---|---|---|
| 5,774,695 A | * 6/1998 | Autrey et al. | 703/26 |
| 5,953,335 A | 9/1999 | Erimli et al. | |
| 5,995,514 A | * 11/1999 | Lo | 370/463 |
| 6,029,202 A | * 2/2000 | Frazier et al. | 709/232 |
| 6,260,167 B1 | * 7/2001 | Lo et al. | 714/744 |
| 6,363,432 B1 | * 3/2002 | Laber | 709/250 |
| 2002/0067735 A1 | * 6/2002 | Lindstrom et al. | 370/422 |
| 2002/0091508 A1 | * 7/2002 | Hadass et al. | 703/25 |

OTHER PUBLICATIONS

IEEE, The Authoritative Dictionary of IEEE Standards Terms, Standards Infromation Network IEEE Press, Seventh Edition, pp: 683, 824.*

Spurgeon, Charles E., Ethernet: the Definitive Guide, Feb. 2000, O'Reilly, section 6.2.*

* cited by examiner

Primary Examiner—Robert Beausoliel
Assistant Examiner—Christopher McCarthy
(74) Attorney, Agent, or Firm—Manelli Denison & Selter PLLC; Leon R. Turkevich

(57) ABSTRACT

A test system includes a switch emulator, a network test device, and an interface converter. The switch emulator is configured for transmitting first network data on a first media independent interface based on a first interface clock, and the network test device configured for transmitting second network data on a second media independent interface based on a second interface clock. The interface converter, having inverted media independent interfaces, is configured for transferring the first and second network data between the first and second media independent interfaces, and supplying the first and second interface clocks based on an external clock generated by the switch emulator. Hence, network data can be passed between the switch emulator and the network test device according to network protocols, even if the switch emulator is operating at relatively slow speeds.

13 Claims, 1 Drawing Sheet

ARRANGEMENT FOR REDUCING A MEDIA INDEPENDENT INTERFACE SPEED IN A NETWORK SWITCH EMULATION SYSTEM

BACKGROUND OF THE INVENTION

1. Field of the Invention

The present invention relates to testing of integrated network devices such as integrated network switches configured for switching data packets between subnetworks.

2. Background Art

Local area networks use a network cable or other media to link stations on the network. Each local area network architecture uses a media access control (MAC) enabling network interface devices at each network node to access the network medium.

Switched local area networks are encountering increasing demands for higher speed connectivity, more flexible switching performance, and the ability to accommodate more complex network architectures. For example, commonly-assigned U.S. Pat. No. 5,953,335 discloses a network switch configured for switching layer 2 type Ethernet (IEEE 802.3) data packets between different network nodes; a received layer 2 type data packet may include a VLAN (virtual LAN) tagged frame according to IEEE 802.1p (802.1D) protocol that enables the network switch to perform more advanced switching operations. For example, the VLAN tag may specify another subnetwork (via a router) or a prescribed group of stations.

A particular concern in testing high-performance integrated network switches implemented on a single chip is incompatibility of existing test equipment with newer switch designs. For example, switch emulation systems are computer-based systems that execute software configured for simulating network switch operations. Hence, switch designers and testers may wish to test the switch emulation systems (simulating a network switch under design) to validate the operation and performance of the network switch.

Unfortunately, the computer-based switch emulation system may not be usable with existing network based test instruments configured for testing network devices according to IEEE 802.3 protocol. In particular, conventional test instruments, such as a packet generator or a network analyzer, may be configured for sending and receiving data across a 10BaseT or 100 BaseT interface. The switch emulation system, however, is generally unable to execute at the rate of the 10BaseT/100 BaseT interfaces of the typical test instruments. Hence, the switch emulation system, operating much slower than the 10BaseT/100 BaseT interfaces of the typical test instruments, cannot be connected to the test instruments using a normal Ethernet type connection.

SUMMARY OF THE INVENTION

There is a need for an arrangement that enables a switch emulation system, configured for emulating prescribed switch operations, to be connected to network based test equipment for evaluation of the prescribed switch operations.

These and other needs are attained by the present invention, where a test system includes a switch emulator, a network test device, and an interface converter. The switch emulator is configured for transmitting first network data on a first media independent interface based on a first interface clock, and the network test device configured for transmitting second network data on a second media independent interface based on a second interface clock. The interface converter, having inverted media independent interfaces, is configured for transferring the first and second network data between the first and second media independent interfaces, and supplying the first and second interface clocks based on an external clock generated by the switch emulator. Generation of the first and second interface clocks based on the external clock generated by the switch emulator enables the MII interfaces of the switch emulator and the network test device to be synchronized, ensuring that network data can be passed between the switch emulator and the network test device according to network protocols, even if the switch emulator is operating at relatively slow speeds.

One aspect of the present invention provides a method for sending data in a test system having a switch emulator and a network test device. The method includes first outputting from the switch emulator first network data on a first media independent interface based on a first interface clock, and outputting from the switch emulator a reference clock. The method also includes converting the first network data for reception by a second media independent interface of the network test device configured for receiving network data based on a second interface clock, and generating the first and second interface clocks based on the reference clock.

Another aspect of the present invention provides an apparatus. The apparatus includes a first inverted media independent interface configured for receiving first data, and supplying second data and a first interface clock, for a connected first media independent interface, and a second inverted media independent interface configured for receiving the second data, and supplying the first data and a second interface clock, for a connected second media independent interface. The apparatus also includes a clock generation circuit configured for generating the first interface clock and the second interface clock based on an external reference clock.

Still another aspect of the present invention provides a test system comprising a switch emulator, a test instrument, and an interface converter. The switch emulator has a first media independent interface configured for outputting first network data based on a first interface clock, the switch emulator outputting a reference clock. The test instrument has a second media independent interface configured for outputting second network data based on a second interface clock. The interface converter is configured for generating the first and second interface clocks based on the reference clock. The interface converter converts the first network data for reception by the second media independent interface, and the second network data for reception by the first media independent interface.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
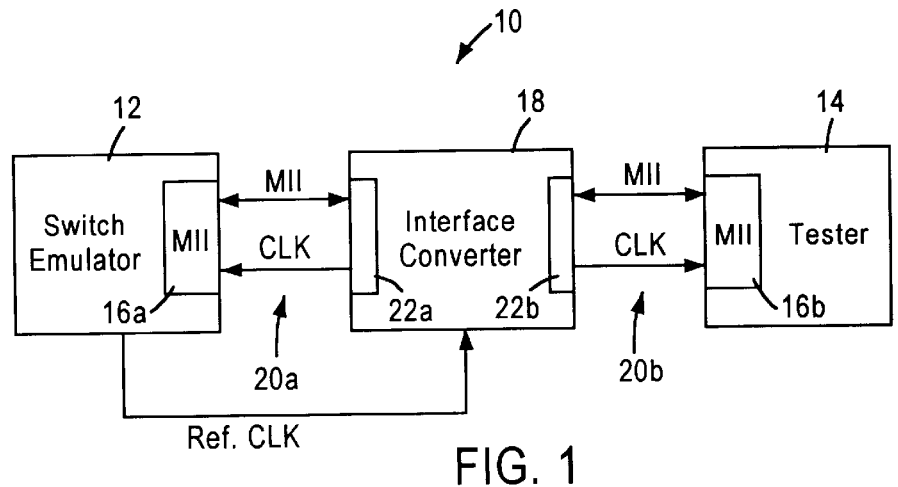
FIG. 1 is a block diagram of system configured for testing a switch emulator across a network-based link according to an embodiment of the present invention.

FIG. 1 is a block diagram illustrating a test system 10 configured for testing a prescribed switching logic for an integrated (i.e., single chip) network device using a switch emulator 12 and a test instrument 14 according to an embodiment of the present invention. The switch emulator 12 and the test instrument 14 each have an exposed media independent interface (MII) 16 configured for connection, for example, with an external physical layer transceiver according to Ethernet (IEEE 802.3) protocol. For example, each media independent interface 16 is configured for connection with an external physical layer transceiver using an MII connection 20. Each MII interface 16 also is configured for sending and receiving data based on an external interface clock (CLK), described below.

The test system 10 also includes an interface converter 18 configured for coupling the media independent interfaces 16 for transfer of data. In particular, each MII 16 is configured for outputting transmit data, and receiving receive data, from a physical layer transceiver; hence, the interface converter 18 includes inverted media independent interfaces 22 configured for receiving transmit data from one MII connection (e.g., 20a), and outputting the received transmit data onto the other MII connection (e.g., 20b) as receive data, described in further detail below with respect to FIG. 2.

The interface converter 18 also is configured for receiving a reference clock from the switch emulator 12, and generating the interface clocks (CLK) for the media independent interfaces 16a and 16b. Hence, the media independent interfaces 16a and 16b are synchronized relative to the reference clock of the switch emulator 12, enabling data to be transferred between the switch emulator 12 and the tester 14 according to IEEE 802.3 protocol, while accommodating the slower processing rate of the switch emulator 12.

Figure 2:
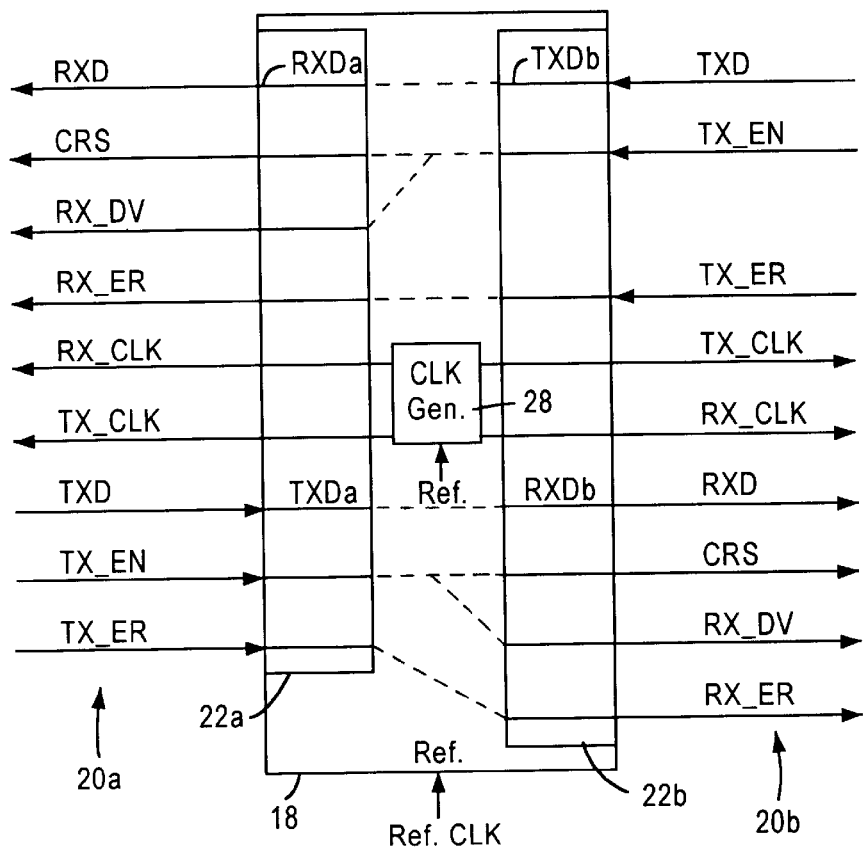
FIG. 2 is a diagram illustrating in detail the interface converter of FIG. 1 according to an embodiment of the present invention.

FIG. 2 is a diagram illustrating in detail the interface converter 18. The interface converter 18 includes the first inverted MII 22a configured for receiving transmit data (TXDa) from the switch emulator 12 via the MII connection 20a, and outputting receive data (RXDa) to the switch emulator 12 via the MII connection 20a. The interface converter 18 also includes the second inverted MII 22b, configured for receiving transmit data (TXDb) from the test equipment 14 via the MII connection 20b, and outputting receive data (RXDb) to the test equipment 14 via the MII connection 20b. The interface converter 18 converts the transmit data (TXDa) from the switch emulator 12 into receive data (RXDb) for the test equipment 14, and converts the transmit data (TXDb) received on the second inverted MII 22b from the test equipment 14 into receive data (RXDa) for the switch emulator 12. Hence, the interface converter 18 enables the coupling of the media independent interfaces 16 without the necessity of a physical layer transceiver.

In addition, the interface converter 18 includes a clock generation circuit 28 configured for generating the interface clocks output by the inverted media independent interfaces 22a and 22b for synchronization of the MII's 16. In particular, the clock generation circuit 28 receives the external reference clock from the switch emulator 12, and outputs the transmit clock signal (TX_CLK) and receive clock signal (RX_CLK) on each of the inverted media independent interfaces 22a and 22b. Hence, reception of the transmit clock signal (TX_CLK) and receive clock signal (RX_CLK) by each of the media independent interfaces 16 enables the media independent interfaces 16 to be synchronized relative to the switch emulator 12. Hence, network data can be transferred between the switch emulator 12 and the tester 14 according to network based protocols such as Ethernet (IEEE 802.3) protocol, using clock rates driven by the switch emulator 12.

According to the disclosed embodiment, data streams can be transferred between the switch emulator and a network tester according to network based protocols, such as Ethernet (IEEE 802.3) protocol, at lower interface clock rates synchronized to the switch emulator. Hence, network data can be transferred along media independent interface connections at clock speeds based on the switch emulator, enabling reliable testing of switching logic using the switch emulator prior to reduction to silicon.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method for sending data in a test system having a switch emulator and a network test device, the method comprising:

first outputting from the switch emulator first network data on a first media independent interface based on a first interface clock;

second outputting from the switch emulator a reference clock;

converting the first network data for reception by a second media independent interface of the network test device configured for receiving network data based on a second interface clock; and generating the first and second interface clocks for the first and second media independent interfaces, respectively, based on the reference clock.

2. The method of claim 1, wherein the converting step includes:

receiving the first network data by an interface converter having a first inverted media independent interface coupled to the first media independent interface; and third outputting the first network data by the interface converter onto a second inverted media independent interface coupled to the second media independent interface.

3. The method of claim 2, wherein the generating step includes outputting the first and second interface clocks by the interface converter onto the first and second inverted media independent interfaces, respectively, based on the reference clock.

4. The method of claim 2, wherein the third outputting step includes outputting the first network data onto a receive data path of the second media independent interface.

5. The method of claim 2, further comprising:

fourth outputting by the network test device second network data onto the second media independent interface based on the second interface clock; and second converting the second network data by the interface converter for reception by the first media independent interface according to the first interface clock.

6. The method of claim 5, wherein the second converting step includes outputting the second network data onto a receive data path of the first media independent interface.

7. An apparatus comprising:
- a first inverted media independent interface configured for receiving first data from a connected first media independent interface, and supplying second data and a first interface clock to the connected first media independent interface;
- a second inverted media independent interface configured for receiving the second data from a connected second media independent interface, and supplying the first data and a second interface clock to the connected second media independent interface; and
- a clock generation circuit configured for generating the first interface clock and the second interface clock based on an external reference clock.

8. The apparatus of claim 7, wherein the first and second data are output according to IEEE 802.3 protocol.

9. The apparatus of claim 7, wherein:
- the first inverted media independent interface includes a first transmit path and a first receive path and the second inverted media independent interface includes a second transmit path and a second receive path;
- the first inverted media independent interface is configured for receiving the first data on the first transmit path from the first media independent interface and supplying the first data onto the second receive path for supply by the second inverted media independent interface to the second media independent interface;
- the second inverted media independent interface is configured for receiving the second data on the second transmit path from the second media independent interface and supplying the second data onto the first receive path for supply by the first inverted media independent interface to the first media independent interface.

10. The apparatus of claim 9, wherein:
- the first inverted media independent interface is configured for receiving the first data as first transmit data on the first transmit path; and
- the second inverted media independent interface is configured for receiving the second data as second transmit data on the second transmit path.

11. The apparatus of claim 9, wherein:
- the first inverted media independent interface includes a first transmit enable path for receiving a first transmit enable signal from the first media independent interface, a first carrier sense path for outputting a first carrier sense signal to the first media independent interface, and a first receive data valid path for outputting a first receive data valid signal to the first media independent interface;
- the second inverted media independent interface includes a second transmit enable path for receiving a second transmit enable signal from the second media independent interface, a second carrier sense path for outputting a second carrier sense signal to the second media independent interface, and a second receive data valid path for outputting a second receive data valid signal to the second media independent interface;
- the first inverted media independent interface configured for supplying the first transmit enable signal to the second carrier sense path and the second receive data valid path for supply by the second inverted media independent interface to the second media independent interface; and
- the second inverted media independent interface configured for supplying the second transmit enable signal to the first carrier sense path and the first receive data valid path for supply by the first inverted media independent interface to the first media independent interface.

12. A test system comprising:
- a switch emulator having a first media independent interface configured for outputting first network data based on a first interface clock, the switch emulator outputting a reference clock;
- a test instrument having a second media independent interface configured for outputting second network data based on a second interface clock; and
- an interface converter configured for generating the first and second interface clocks based on the reference clock, the interface converter converting the first network data for reception by the second media independent interface, and the second network data for reception by the first media independent interface.

13. The apparatus of claim 12, wherein the interface converter includes:
- a first inverted media independent interface configured for receiving the first network data, and supplying the second network data and the first interface clock, to the connected first media independent interface according to IEEE 802.3 protocol;
- a second inverted media independent interface configured for receiving the second network data, and supplying the first network data and the second interface clock, to the connected second media independent interface according to IEEE 802.3 protocol; and
- a clock generation circuit configured for generating the first and second interface clocks based on the reference clock.

* * * * *